(12) United States Patent
Zhong et al.

(10) Patent No.: US 11,581,588 B2
(45) Date of Patent: Feb. 14, 2023

(54) ENERGY STORAGE SYSTEM

(71) Applicant: Huawei Digital Power Technologies Co., Ltd., Shenzhen (CN)

(72) Inventors: Zheng Zhong, Shenzhen (CN); Xiangmin Ma, Shenzhen (CN); Wanxiang Ye, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 21 days.

(21) Appl. No.: 17/358,907

(22) Filed: Jun. 25, 2021

(65) Prior Publication Data

US 2021/0328276 A1 Oct. 21, 2021

Related U.S. Application Data

(63) Continuation of application No. PCT/CN2019/106657, filed on Sep. 19, 2019.

(30) Foreign Application Priority Data

Dec. 29, 2018 (CN) .......................... 201811639775.8

(51) Int. Cl.
*H01M 10/46* (2006.01)
*H01M 50/584* (2021.01)
(Continued)

(52) U.S. Cl.
CPC ....... *H01M 10/46* (2013.01); *H01M 10/0525* (2013.01); *H01M 10/425* (2013.01);
(Continued)

(58) Field of Classification Search
CPC ............. H01M 10/46; H01M 10/0525; H01M 10/425; H01M 50/244; H01M 50/296;
(Continued)

(56) References Cited

U.S. PATENT DOCUMENTS 7,199,615 B2 * 4/2007 Stojanovic ............... H04B 1/04
326/82
9,819,059 B2 * 11/2017 Park .................... H01M 10/425
(Continued)

FOREIGN PATENT DOCUMENTS

CN 102610776 A 7/2012
CN 106100068 A 11/2016
(Continued)

*Primary Examiner* — M Baye Diao
(74) *Attorney, Agent, or Firm* — Womble Bond Dickinson (US) LLP

(57) ABSTRACT

The energy storage system includes battery cells, a subrack, a backplane, and a battery management system BMS. The subrack reserves a plurality of battery cell slots, the battery cells are connected to the backplane through the battery cell slots. The backplane is installed in the subrack, a first power terminal is reserved at a position corresponding to the battery cell slot on the backplane, and a plug-in power terminal is formed by a second power terminal of the battery cell together with the first power terminal. A power circuit, a sampling circuit, and an equalizer circuit are integrated into the backplane, and the power circuit, the sampling circuit, and the equalizer circuit are connected after the second power terminal is plugged and docked with the first power terminal. The BMS is connected to the backplane for managing the energy storage system.

5 Claims, 4 Drawing Sheets

(51) Int. Cl.
 *H01M 50/296*  (2021.01)
 *H01M 50/244*  (2021.01)
 *H01M 10/0525*  (2010.01)
 *H01M 10/42*  (2006.01)
 *H02J 7/00*  (2006.01)

(52) U.S. Cl.
 CPC ....... *H01M 50/244* (2021.01); *H01M 50/296* (2021.01); *H01M 50/584* (2021.01); *H02J 7/0016* (2013.01); *H01M 2010/4271* (2013.01)

(58) Field of Classification Search
 CPC ....... H01M 50/584; H01M 2010/4271; H01M 10/052; H01M 10/48; H01M 50/209; H01M 50/249; H01M 50/258; H02J 7/0016; Y02T 10/70
 USPC ......................................................... 320/128
 See application file for complete search history.

(56) References Cited

U.S. PATENT DOCUMENTS

| | | | | |
|---|---|---|---|---|
| 10,153,658 B2* | 12/2018 | Nandam | ............... | H02J 7/0045 |
| 10,193,357 B2* | 1/2019 | Marinov | ................... | H02J 7/00 |
| 10,697,417 B2* | 6/2020 | Koenen | ............... | H01M 50/213 |
| 10,749,430 B2* | 8/2020 | Gao | .................. | H02J 7/007194 |
| 11,235,718 B2* | 2/2022 | Hagi | ........................ | B60L 50/61 |
| 11,383,617 B2* | 7/2022 | Woeste | ................. | H02J 7/0014 |
| 2009/0066291 A1* | 3/2009 | Tien | ...................... | H02J 7/0016 |
| | | | | 320/118 |
| 2016/0211698 A1 | 7/2016 | Nandam et al. | | |

FOREIGN PATENT DOCUMENTS

| | | |
|---|---|---|
| CN | 106114275 A | 11/2016 |
| CN | 106356927 A | 1/2017 |
| CN | 106740228 A | 5/2017 |
| CN | 206510769 U | 9/2017 |
| CN | 206759134 U | 12/2017 |
| CN | 107742914 A | 2/2018 |
| CN | 107878239 A | 4/2018 |
| CN | 108482149 A | 9/2018 |
| CN | 109786599 A | 5/2019 |
| JP | 2002117821 A | 4/2002 |
| JP | 2013126343 A | 6/2013 |
| KR | 20180050156 A | 5/2018 |
| WO | 2011025937 A2 | 3/2011 |
| WO | 2018222546 A2 | 12/2018 |

\* cited by examiner

ENERGY STORAGE SYSTEM

CROSS-REFERENCE TO RELATED APPLICATIONS

This application is a continuation of International Application No. PCT/CN2019/106657, filed on Sep. 19, 2019, which claims priority to Chinese Patent Application No. 201811639775.8, filed on Dec. 29, 2018. The disclosures of the aforementioned applications are hereby incorporated by reference in their entireties.

TECHNICAL FIELD

This application relates to the battery field, and in particular, to an energy storage system.

BACKGROUND

With the development of lithium-ion battery technologies, lithium-ion batteries have become widely used in fields such as communication power supplies, data centers, microgrid energy storage, and electric vehicles. As processes and techniques mature, capacity of a single battery cell is gradually increasing. At present, large-capacity battery cells in the industry have reached about 300 ampere-hours (Ah). However, this capacity is still small compared with that of lead-acid batteries. Therefore, a plurality of battery cells usually need to be connected in series and parallel in application. At present, when electric vehicles and energy storage use lithium batteries, a usual practice is to first connect battery cells in series and parallel to combine into a standard pack module, and then install the standard pack module into installation space such as an energy storage cabinet, a rack, or an electric vehicle chassis, with power and sampling harnesses separately connected to form a backup power supply system to provide power to the outside.

A communication energy storage application is used as an example. After lithium-ion batteries are screened by specifications, selected batteries are usually connected in series and parallel to form a pack module of 15 to 16 strings (lithium iron phosphate). The pack module contains components such as a sampling harness, a power connection bar, an insulating sheet, and a fixing bracket; then a battery management system (BMS) control board and the pack module are combined into an integrated 48-volt (V) battery product. In practical application, the 48 V battery product is installed in a cabinet with a communication line and a power line connected.

In this solution, battery cells need to be assembled into a pack, and then the pack is combined with a BMS to form a battery module. Therefore, a large quantity of protective and fixing apparatuses need to be configured, thereby increasing costs and production cycles.

SUMMARY

Embodiments of this application provide an energy storage system, to simplify production of lithium battery packs, improve installation efficiency of lithium batteries, reduce costs, and improve system reliability.

According to a first aspect, an embodiment of this application provides an energy storage system including: battery cells, a subrack, a backplane, and a battery management system (BMS), where a plurality of battery cell slots are reserved in the subrack, so that the battery cells can be connected to the backplane through the battery cell slots; the backplane is installed in the subrack, a first power terminal is reserved at a position corresponding to the battery cell slot on the backplane, and a plug-in power terminal is formed by a second power terminal of the battery cell together with the first power terminal through the battery cell slot; a power circuit, a sampling circuit, and an equalizer circuit are integrated into the backplane, and the power circuit, the sampling circuit, and the equalizer circuit are connected after the second power terminal is plugged and docked with the first power terminal; and the BMS is connected to the backplane for managing the energy storage system.

In this embodiment, the battery cell slots reserved in the subrack of the energy storage system may be determined depending on a particular application scenario. For example, if the application scenario of the energy storage system requires the energy storage system to output a voltage of 48 V, the subrack may be designed to reserve 18 or more battery cell slots. The BMS may further communicate with a host computer. A current generated by discharge of the battery cells is connected by the power circuit to positive and negative busbars; while the sampling circuit and the equalizer circuit collect parameters, such as a voltage, of each of the battery cells, and support discharge of each of the battery cells without connection to the positive and negative busbars.

In the technical solution provided by this embodiment of this application, the battery cells no longer need to be assembled into a pack and then fixedly installed, but directly form a pluggable power terminal with the backplane, so as to realize pluggable installation of the battery cells. This can effectively simplify production of lithium battery packs, improve efficiency of lithium battery installation and reduce costs.

In one embodiment, in the energy storage system, a bypass switch may be added to the power circuit integrated into the backplane (herein the power circuit can be referred to as a battery cell branch), and then the battery cell is connected to the backplane through the reserved battery cell slot in the subrack (that is, when the second power terminal is docked with the first power terminal), the bypass switch is opened (to avoid a short circuit), and a switch of the battery cell branch is closed, realizing communication of the battery cell with the power circuit, the sampling circuit, and the equalizer circuit; and when the battery cell is not connected to the backplane (that is, when the second power terminal is not docked with the first power terminal) or the battery cell fails, the switch of the battery cell branch is opened, and the bypass switch is closed (to achieve circuit conductivity and prevent an open circuit). In this way, it can be implemented that, when a battery cell fails, the system automatically bypasses the failed battery cell and outputs corresponding power through boosting by the BMS. Therefore, the system can function properly, and maintenance personnel can directly replace the failed battery cell instead of cutting off power supply and replacing an entire battery cell combination, thereby enabling the system to provide highly reliable power supply and reducing maintenance costs.

In one embodiment, the BMS may manage the energy storage system in the following manner: when an output voltage of the energy storage system is lower than a preset load value, the BMS increases the output voltage of the energy storage system to the preset load value (that is, the BMS boosts the energy storage system); when the output voltage of the energy storage system is higher than the preset load value, the BMS reduces the output voltage of the energy storage system to the preset load value (that is, the BMS steps down the energy storage system); and when the output voltage of the energy storage system matches the preset load value, the BMS supports a load by using a direct connect mode. This can ensure a consistent output voltage of the energy storage system during application, thereby increasing reliability of the energy storage system.

In one embodiment, to enable the battery cell to be docked with the backplane in a hot-pluggable manner, the second power terminal of the battery cell may be designed as a plug-in terminal male connector welded to a cover of the battery cell, and the first power terminal of the backplane is designed as a plug-in terminal female connector welded to the backplane; or, the second power terminal of the battery cell may be designed as a plug-in terminal male connector welded to an electrode pole of the battery cell, and the first power terminal of the backplane is designed as a plug-in terminal female connector welded to the backplane; or, the second power terminal of the battery cell may be designed as a plug-in terminal female connector welded to a cover of the battery cell, and the first power terminal of the backplane is designed as a plug-in terminal male connector welded to the backplane; or, the second power terminal of the battery cell may be designed as a plug-in terminal female connector welded to an electrode pole of the battery cell, and the first power terminal of the backplane is designed as a plug-in terminal male connector welded to the backplane. The particular situation is not limited herein.

In one embodiment, a connection between the BMS and the backplane may also be hot-pluggable. This can facilitate convenience of maintaining the BMS.

In one embodiment, the battery cell may be a combined battery module, or a single battery cell, as long as the battery cell can be hot-pluggable to the energy storage system.

DESCRIPTION OF EMBODIMENTS

Embodiments of this application provide an energy storage system, to improve reliability of an energy storage system as backup power and flexibility of installation and configuration, thereby simplifying production of lithium battery packs, improving installation efficiency of lithium batteries and reducing costs.

In the specification, claims, and accompanying drawings of this application, the terms "first", "second", "third", "fourth", and so on (if existent) are intended to distinguish between similar objects but do not necessarily indicate a particular order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of operations or units is not necessarily limited to those units, but may include other units not expressly listed or inherent to such a process, method, system, product, or device.

Figure 1:
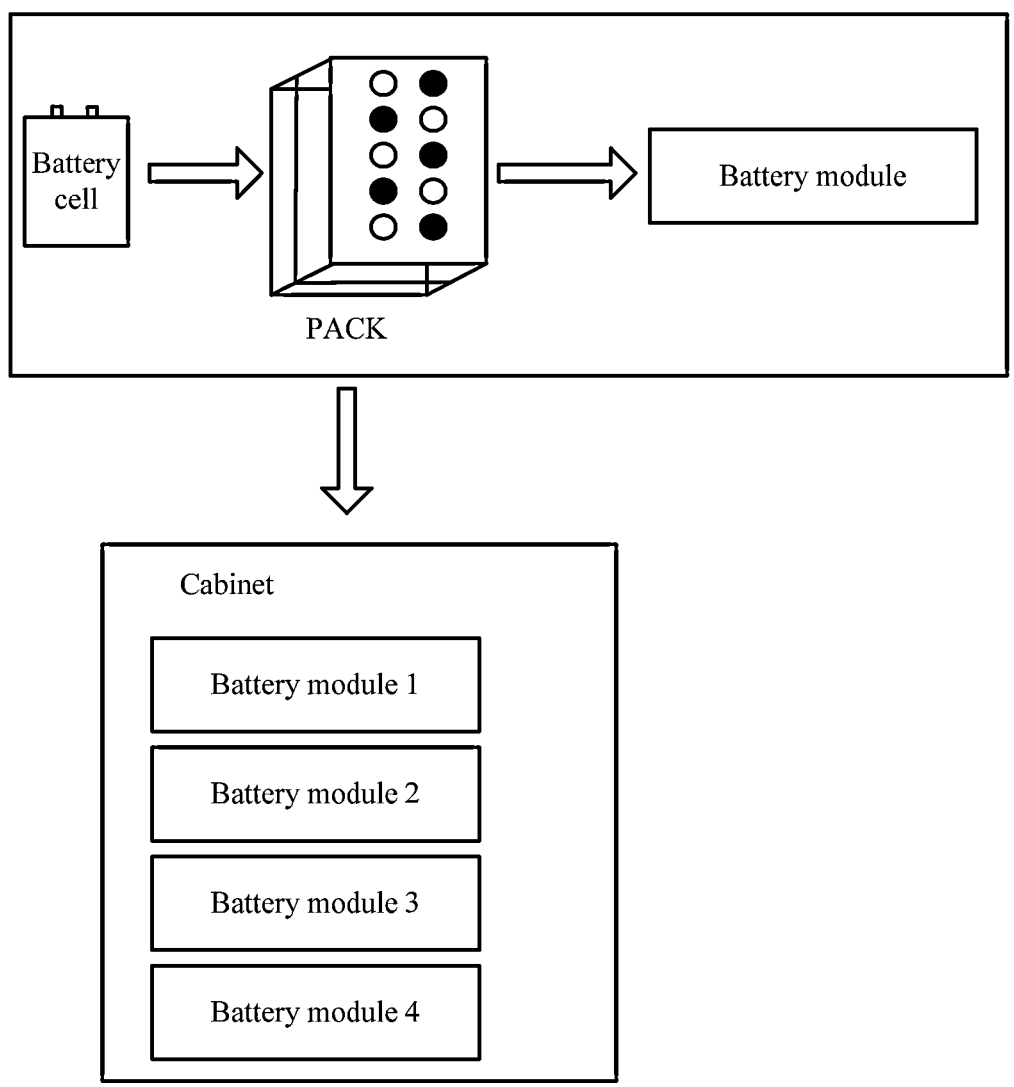
FIG. 1 is a schematic diagram of assembling of a battery module.

With the development of lithium-ion battery technologies, lithium-ion batteries have become widely used in fields such as communication power supplies, data centers, microgrid energy storage, and electric vehicles. As processes and techniques mature, capacity of a single battery cell is gradually increasing. At present, large-capacity battery cells in the industry have reached about 300 ampere-hours (Ah). However, this capacity is still small compared with that of lead-acid batteries. Therefore, a plurality of battery cells usually need to be connected in series and parallel in application. As shown in FIG. 1, for current lithium batteries, a usual practice is to first connect battery cells in series and parallel to combine into a standard pack module; and then install the standard pack module into installation space such as an energy storage cabinet, a rack, or an electric vehicle chassis, with power and sampling harnesses separately connected to form a backup power supply system to provide power to the outside. A communication energy storage application is used as an example. After lithium-ion batteries are screened by specifications, selected batteries are usually connected in series and parallel to form a pack module of 15 to 16 strings. The pack module contains components such as a sampling harness, a power connection bar, an insulating sheet, and a fixing bracket. Then a battery management system (BMS) control board and the pack module are combined into an integrated 48 V battery product. In practical application, the 48 V battery product is installed in a cabinet with a communication line and a power line connected. In this solution, battery cells need to be assembled into a pack, and then the pack is combined with a BMS to form a battery module. Therefore, a large quantity of protective and fixing apparatuses need to be configured, thereby increasing costs and production cycles.

An embodiment of this application provides the following energy storage system, including: battery cells, a subrack, a backplane, and a battery management system (BMS), where a plurality of battery cell slots are reserved in the subrack, so that the battery cells can be connected to the backplane through the battery cell slots; the backplane is installed in the subrack, a first power terminal is reserved at a position corresponding to the battery cell slot on the backplane, and a plug-in power terminal is formed by a second power terminal of the battery cell together with the first power terminal through the battery cell slot; a power circuit, a sampling circuit, and an equalizer circuit are integrated into the backplane, and the power circuit, the sampling circuit, and the equalizer circuit are connected after the second power terminal is plugged and docked with the first power terminal; and the BMS is connected to the backplane for managing the energy storage system.

Figure 2:
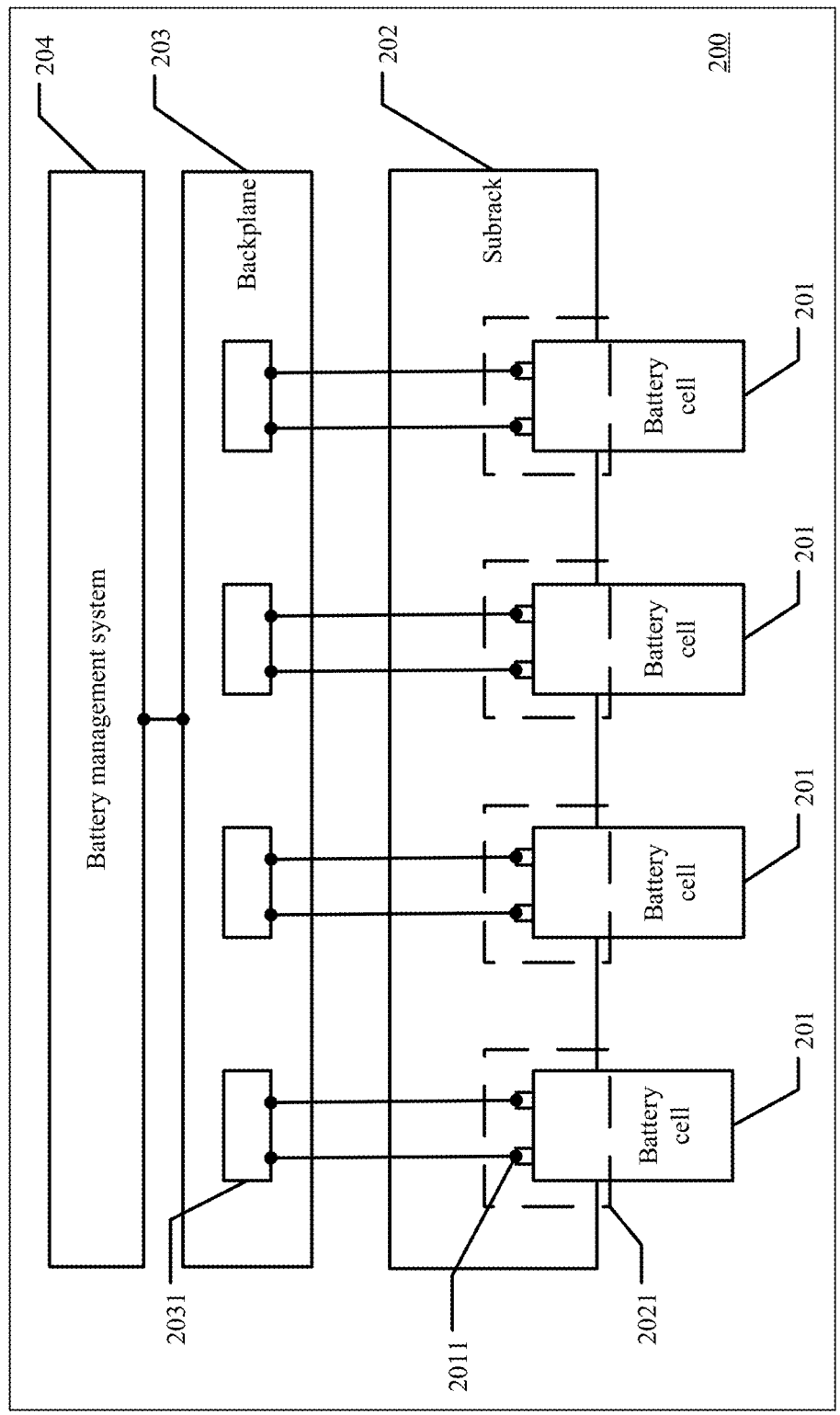
FIG. 2 is a schematic diagram of an embodiment of an energy storage system according to an embodiment of this application.

Referring to FIG. 2, an energy storage system 200 includes: battery cells 201, a subrack 202, a backplane 203, and a BMS 204. A plurality of battery cell slots 2021 are reserved in the subrack 202, so that the battery cells 201 can be connected to the backplane 203 through the battery cell slots 2021. The backplane 203 is installed in the subrack 202, a first power terminal 2031 is reserved at a position corresponding to the battery cell slot 2021 on the backplane 203, and a plug-in power terminal is formed by a second power terminal 2011 of the battery cell 201 together with the first power terminal 2031. A power circuit, a sampling circuit, and an equalizer circuit are further integrated into the backplane 203, and the power circuit, the sampling circuit, and the equalizer circuit are connected to form a power supply circuit when the second power terminal 2011 is plugged and docked with the first power terminal 2031; and the BMS 204 is connected to the backplane 203 for managing the energy storage system 200.

Figure 3:
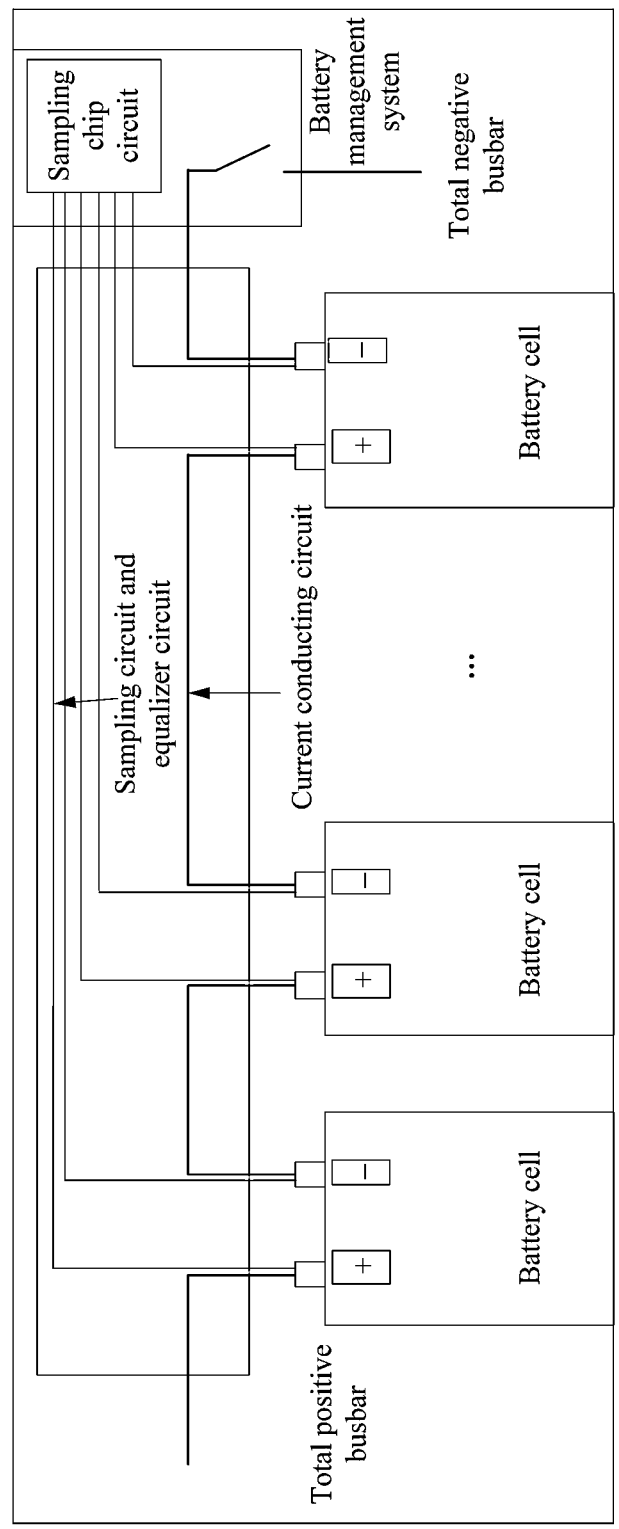
FIG. 3 is a schematic diagram of a backplane integrated circuit according to an embodiment of this application.

It can be understood that an example way of the power conducting circuit, the sampling circuit, and the equalizer circuit integrated into the backplane 203 may be shown in FIG. 3. The battery cells 201 are connected in series through the power circuit and connected to a total positive busbar and a total negative busbar; and the sampling circuit and the equalizer circuit are separately connected with each battery cell 201, so as to collect parameters, such as a voltage, of the battery cell 201 and send the parameters to a sampling chip circuit of the battery management system BMS, so that the BMS can manage the energy storage system including the battery cells 201. The BMS 204 may manage the energy storage system in the following manner: when an output voltage of the energy storage system 200 is lower than a preset load value, the BMS 204 increases the output voltage of the energy storage system 200 to the preset load value (that is, the BMS 204 boosts the energy storage system 200); when the output voltage of the energy storage system is higher than the preset load value, the BMS 204 reduces the output voltage of the energy storage system 200 to the preset load value (that is, the BMS 204 steps down the energy storage system); and when the output voltage of the energy storage system 200 matches the preset load value, the BMS 204 supports a load by using a direct connect mode. This can ensure a consistent output voltage of the energy storage system 200 during application, thereby increasing reliability of the energy storage system 200. It can be understood that a hot-pluggable connection may also be formed between the BMS 204 and the backplane. This can facilitate convenience of maintaining the BMS.

Figure 4:
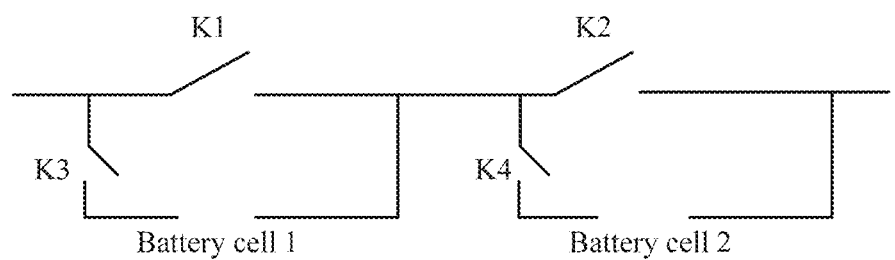
FIG. 4 is a schematic diagram of a bypass switch and a battery cell branch according to an embodiment of this application.

It can be understood that a bypass switch is added for each battery cell in the power circuit integrated into the backplane 201 (herein the power circuit can be referred to as a battery cell branch), and then the battery cell 201 is connected to the backplane 203 through a reserved battery cell slot 2021 in the subrack 202 (that is, when the second power terminal 2011 is docked with the first power terminal 2031), the bypass switch is opened (to avoid a short circuit), and a switch of the battery cell branch is closed, realizing communication of the battery cell with the power circuit, the sampling circuit, and the equalizer circuit; and when the battery cell 201 is not connected to the backplane 203 (that is, when the second power terminal 2011 is not docked with the first power terminal 2031) or the battery cell 201 fails, the switch of the battery cell branch is opened, and the bypass switch is closed (to achieve circuit conductivity and prevent an open circuit). In this way, it can be implemented that, when a battery cell fails, the system automatically bypasses the failed battery cell and outputs corresponding power through boosting by the BMS. Therefore, the system can function properly, and maintenance personnel can directly replace the failed battery cell instead of cutting off power supply and replacing an entire battery cell combination, thereby enabling the system to provide highly reliable power supply and reducing maintenance costs. A circuit example thereof may be shown in FIG. 4. A switch K1 in FIG. 4 is a bypass switch configured for a battery cell 1, a switch K2 is a bypass switch configured for a battery cell 2, a switch K3 is a battery cell branch switch configured for the battery cell 1, and a switch K4 is a battery cell branch switch configured for the battery cell 2. When both the battery cell 1 and the battery cell 2 function properly (in one embodiment, both the battery cell 1 and the battery cell 2 are inserted into battery cell slots, and supply power normally), the switch K1 and the switch K2 are opened, and the switch K3 and the switch K4 are closed; provided that the battery cell 1 fails or the battery cell branch of the battery cell 1 fails for example, being short-circuited, while the battery cell 2 functions properly, the switch K1 is closed, the switch K3 is opened, the switch K2 is opened, and the switch K4 is closed; and provided that the battery cell 2 fails or the battery cell branch of the battery cell 2 fails, for example, being short-circuited, while the battery cell 1 functions properly, the switch K2 is closed, the switch K4 is opened, the switch K1 is opened, and the switch K3 is closed.

Figure 5:
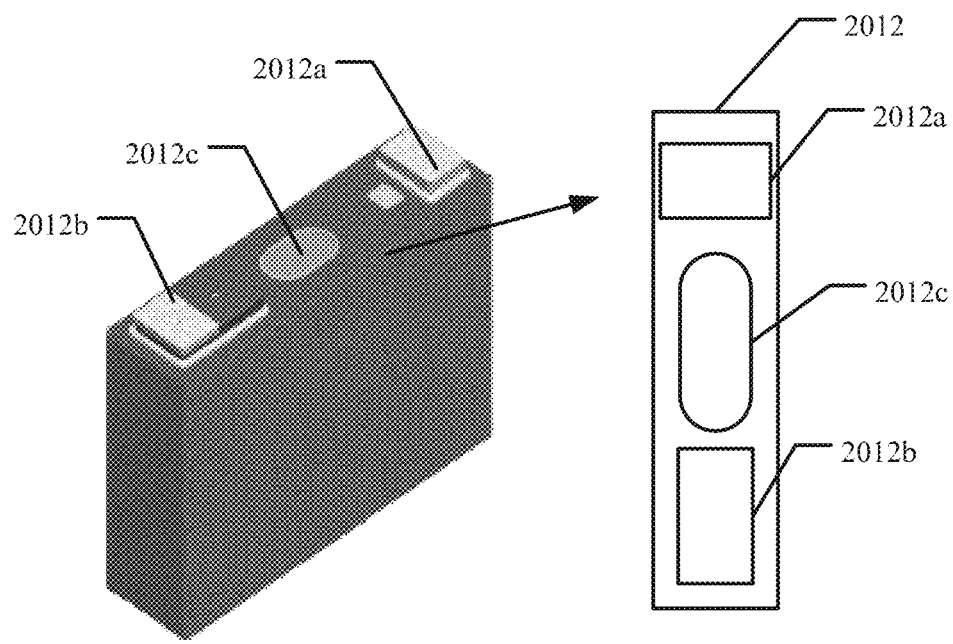
FIG. 5 is a schematic diagram of a cover of a battery cell according to an embodiment of this application.

In the energy storage system shown in FIG. 2, to enable the battery cell 201 to be docked with the backplane 203 in a hot-pluggable manner, the second power terminal 2011 of the battery cell 201 may be designed as a plug-in terminal male connector welded to a cover 2012 of the battery cell 201, and the first power terminal 2031 of the backplane 203 is designed as a plug-in terminal female connector welded to the backplane 203; or, the second power terminal 2011 of the battery cell 201 may be designed as a plug-in terminal male connector welded to an electrode pole of the battery cell, and the first power terminal 2031 of the backplane 203 is designed as a plug-in terminal female connector welded to the backplane 203; or, the second power terminal 2011 of the battery cell 201 may be designed as a plug-in terminal female connector welded to a cover of the battery cell, and the first power terminal 2031 of the backplane 203 is designed as a plug-in terminal male connector welded to the backplane 203; or, the second power terminal 2011 of the battery cell 201 may be designed as a plug-in terminal female connector welded to an electrode pole of the battery cell, and the first power terminal 2031 of the backplane 203 is designed as a plug-in terminal male connector welded to the backplane 203. The cover 2012 of the battery cell 201 may be shown in FIG. 5. The cover 2012 includes a positive electrode pole 2012a and a negative electrode pole 2012b, and an explosion-proof valve 2012c.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the operations of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An energy storage system comprising:
    battery cells, a subrack, a backplane, a battery management system (BMS), and a bypass switch, wherein,
    the subrack reserves a plurality of battery cell slots, and the battery cells are connected to the backplane through the battery cell slots, wherein the BMS and the backplane are connected by plugging;
    the backplane is installed in the subrack, a first power terminal of the backplane is reserved at a position corresponding to the battery cell slot on the backplane, and a plug-in power terminal is formed by a second power terminal of the battery cell together with the first power terminal of the backplane;
    a power circuit, a sampling circuit, and an equalizer circuit are integrated into the backplane, and the power circuit, the sampling circuit, and the equalizer circuit are connected after the second power terminal of the battery cell is plugged and docked with the first power terminal of the backplane; and
    the BMS is connected to the backplane for managing the energy storage system,
    wherein the bypass switch is added in the power circuit;
    wherein, when the second power terminal of the battery cell is plugged and docked with the first power terminal of the backplane, the bypass switch is opened and a switch of the power circuit is closed; and
    when the second power terminal of the battery cell is not plugged and docked with the first power terminal of the backplane or the battery cell fails, the bypass switch is closed and the switch of the power circuit is opened.

2. The energy storage system according to claim 1, wherein the BMS is configured to:
    when an output voltage of the energy storage system is lower than a preset load value, the BMS increases the output voltage of the energy storage system to the preset load value;
    when the output voltage of the energy storage system is higher than the preset load value, the BMS decreases the output voltage of the energy storage system to the preset load value; and
    when the output voltage of the energy storage system is equal to the preset load value, the BMS supports the load by using a direct connect mode.

3. The energy storage system according to claim 1, wherein the second power terminal of the battery cell is a plug-in terminal male connector welded to a cover, and a first power terminal of the backplane is a welded plug-in terminal female connector;
    or
    the second power terminal of the battery cell is a plug-in terminal male connector welded to an electrode pole, and the first power terminal of the backplane is a welded plug-in terminal female connector.

4. The energy storage system according to claim 1, wherein the second power terminal of the battery cell is a plug-in terminal male connector welded to a cover, and a first power terminal of the backplane is a welded plug-in terminal female connector;
    or
    the second power terminal of the battery cell is a plug-in terminal male connector welded to an electrode pole, and the first power terminal of the backplane is a welded plug-in terminal female connector.

5. The energy storage system according to claim 1, wherein the battery cell is a battery module.

* * * * *